STRAINED MOVEMENT DETECTION SYSTEM

Filed Sept. 22, 1961 10 Sheets-Sheet 1

FIG. I.

INVENTOR.
D.R. MC.CAULEY
BY
Forest B. Hitchcock
HIS ATTORNEY

STRAINED MOVEMENT DETECTION SYSTEM

Filed Sept. 22, 1961 10 Sheets-Sheet 2

INVENTOR.
D.R. MC.CAULEY
BY Forest B. Hitchcock
HIS ATTORNEY

STRAINED MOVEMENT DETECTION SYSTEM

Filed Sept. 22, 1961 10 Sheets-Sheet 3

INVENTOR.
D.R. MC.CAULEY
BY
Forest W. Hitchcock
HIS ATTORNEY

Oct. 4, 1966 D. R. McCAULEY 3,277,293

STRAINED MOVEMENT DETECTION SYSTEM

Filed Sept. 22, 1961 10 Sheets-Sheet 4

INVENTOR.

D.R. MC.CAULEY

BY

HIS ATTORNEY

STRAINED MOVEMENT DETECTION SYSTEM

Filed Sept. 22, 1961 10 Sheets-Sheet 5

INVENTOR.
D. R. MC CAULEY
BY
Forest B. Hitchcock
HIS ATTORNEY

STRAINED MOVEMENT DETECTION SYSTEM

Filed Sept. 22, 1961 10 Sheets-Sheet 6

INVENTOR.
D.R. MC.CAULEY
BY
Forest B. Hitchcock
HIS ATTORNEY

INVENTOR.
D.R. MC.CAULEY
BY
HIS ATTORNEY

STRAINED MOVEMENT DETECTION SYSTEM

INVENTOR.
D.R. MC.CAULEY
BY
[signature]
HIS ATTORNEY

STRAINED MOVEMENT DETECTION SYSTEM

Filed Sept. 22, 1961 10 Sheets-Sheet 9

INVENTOR.
D.R. MC.CAULEY
BY
Forest B. Hitchcock
HIS ATTORNEY

INVENTOR.
D.R. MC.CAULEY
BY
Forest W. Hitchcock
HIS ATTORNEY 3,277,293
Patented Oct. 4, 1966

3,277,293

STRAINED MOVEMENT DETECTION SYSTEM

Donald R. McCauley, Rochester, N.Y., assignor to General Signal Corporation, a corporation of New York Filed Sept. 22, 1961, Ser. No. 139,926
11 Claims. (Cl. 246—169)

This invention relates to a strained movement detection system, and, more particularly, pertains to such a system for automatically providing a permanent recording for indicating the railway cars in a train moving over a selected stretch of track which have been subjected to at least one strained movement beyond a predetermined limit.

During the many years of train operation by the American railroads, inestimable incidents of loading damages have occurred. Many of such damages can be properly attributed to human failure in train operation as well as to inaccurate procedure of operation. Such human failings may occur as a train is operated by the engineer through a territory having many small hills and valleys where even a proper operation of such train could cause an excessive strained movement of one or more railway cars, such excessive strained movement being caused by impulsing cars or expulsing cars according to abrupt changes in respective momentums. Improper operation of such train by the engineer could cause excessive strained movements of railway cars even while traveling through substantially level territory. An example of inaccurate procedure may have to do with handling cars in a classification yard where such cars are allowed to roll freely from the car retarder to one of a number of tracks each having other cars standing idle thereon possibly causing excessive strained movements of such cars when impulsing or coming into contact. Other such inaccurate procedures which may result in damaged loadings even though an excessive strained movement does not occur could be that of improper loading of the merchandise into the railway cars initially.

Irrespective of the manner of excessive strained movement occurrence by which damages are caused to the loadings in freight cars, the problem of allocating the responsibility of paying for the damaged merchandise to the proper railroad has, in the past and present, consistently confounded the railroads. It is understandable that damages may result from the occurrence of any one of the above mentioned causes and these causes are known to be present in many varied places during train operation.

The only known procedure employed as an attempt to overcome such problem of responsibility allocation is to provide an impact recorder with the individual crates or boxes of merchandise within the railway cars which limits the relative degrees of strained movement incident to impulsing or expulsing railway cars to only those crates or boxes having impact recorders placed therein. The use of individual impact recorders does have its obvious limitations, however.

It is proposed by the present invention to provide a system for automatically being capable of providing an indication for each railway car of a passing train having a strained movement detector located thereon for determining which cars within such train have been subjected to a strained movement beyond a predetermined limit. In this system, the strained movement detector located on each railway car may have a structure operable according to the excessive strained movement to permit external communication with a receiving means located fixedly at the wayside. Generally speaking, however, the indications provided by the present invention according to a moving train may vary according to the operation of the strained movement detector. That is, should the strained movement detector be externally communicative when the associated railway car has been subjected to a strained movement beyond a predetermined limit, a separate indication can be provided for each such actuated detector. On the other hand, should the strained movement detector be rendered uncommunicative when the associated railway car is subjected to a strained movement beyond a predetermined limit, an indication is provided for only those railway cars having unactuated strained movement detectors.

A strained movement detector employed herein to provide the external communication as noted above utilizes a radioactive material which is, in one instance, permitted to be communicative with a receiving means when the detector is unactuated and uncommunicative when the detector is actuated and, in another instance, permitted to be communicative when the detector is actuated and uncommunicative when the detector is unactuated. In each instance, the receiving means employed at a fixed wayside location may take the form of what is commonly termed a "scintillator" which is comprised of the well known combination of a photomultiplier tube and a radioactive radiation sensitive element combined to produce an output when the element is subjected to incident radioactive radiation for operating novel control circuit arrangements. It is further proposed in this invention to combine an overheated journal detection system with the strained movement detection system of this invention so as to indicate on one recording both the detected overheated journals associated with passing railway cars as well as those railway cars having been subjected to excessive strained movements.

In view of the above, one object of this invention is to provide a system wherein a strained movement detector is located on a railway car with such detector having means for normally communicating externally with a wayside located receiving means but being prevented from providing such communication when actuated by an excessive strained movement of the associated railway car.

Another object of this invention is to provide a system wherein a strained movement detector is located on a railway car with such detector having means for communicating externally with a wayside located receiving means only when the associated railway car has been subjected to an excessive strained movement.

Another object of this invention is to provide a system for automatically monitoring strained movement detectors located individually on passing railway cars each being effective to externally communicate a condition representative of the straining movements taken with respect to a predetermined limit to which the associated car has been subjected.

Another object of this invention is to provide a system for automatically monitoring strained movement detectors individually located on passing railway cars where an indication representative of the railway car and locomotive is provided for each externally communicating strained movement detector and with respect to the time of monitoring.

Another object of this invention is to provide a system for automatically monitoring strained movement detectors individually located on passing railway cars for providing an indication for each railway car and locomotive except the initial locomotive according to each externally communicating strained movement detector monitored.

Another object of this invention is to provide a combined system for automatically monitoring journal temperatures for the different wheels of a railway car and a strained movement detector located on such railway car provided for registering excessive strained movements with indications for overheated journals and the externally communicating strained movement detector being provided in a single recording.

Another object of this invention is to provide a system for automatically monitoring strained movement detectors individually located on passing railway cars where an indication is provided for each externally communicating strained movement detector associated with a railway car.

Other objects, purposes and characteristic features of the present invention will be in part obvious from the accompanying drawings, and in part pointed out as the description of the invention progresses.

In describing the invention in detail, reference will be made to the accompanying drawings, in which the reference characters designate corresponding parts throughout the several views, and in which.

Figure 2:
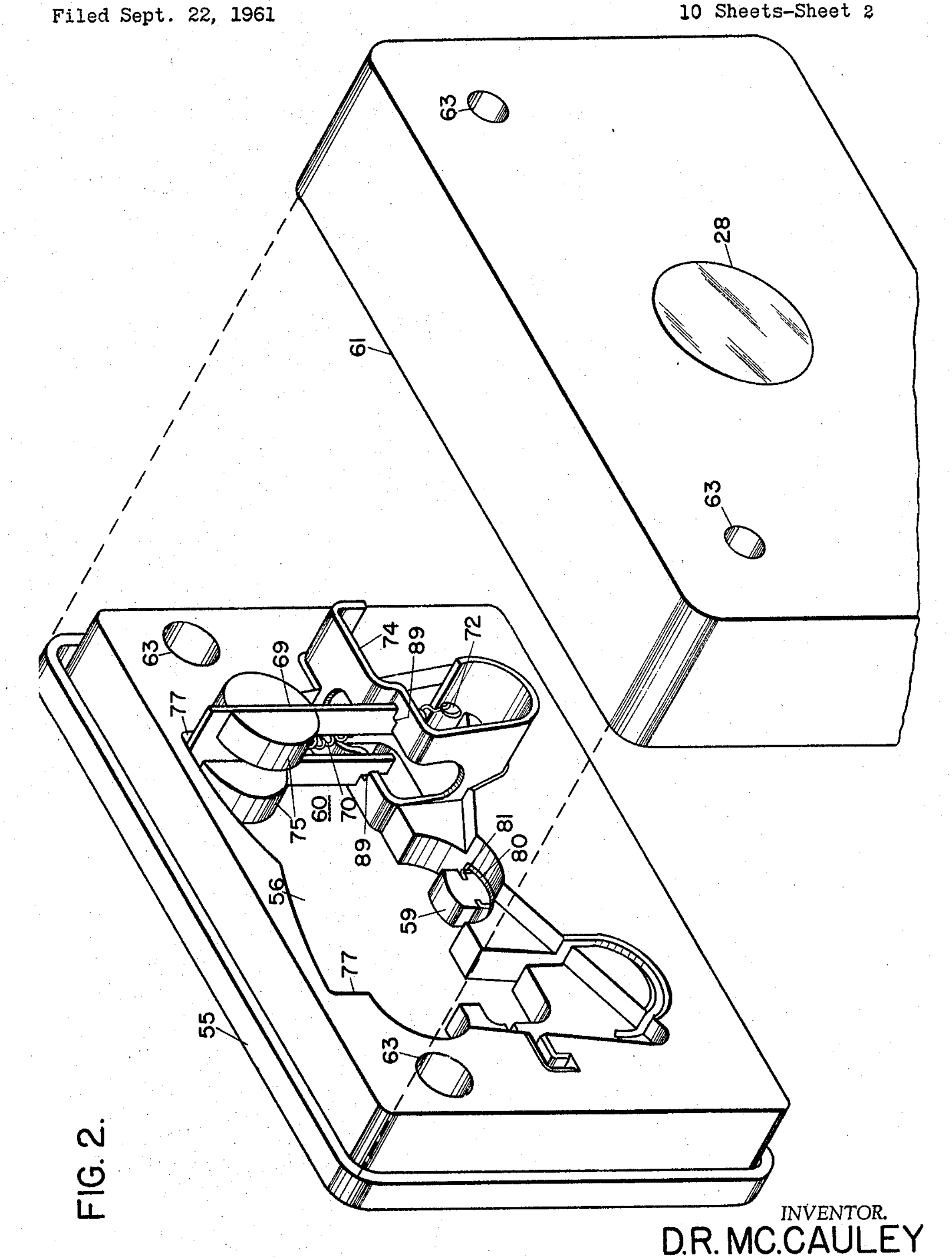
FIG. 2 is an exploded perspective view of one strained movement detector employed in this invention.
Figure 3:
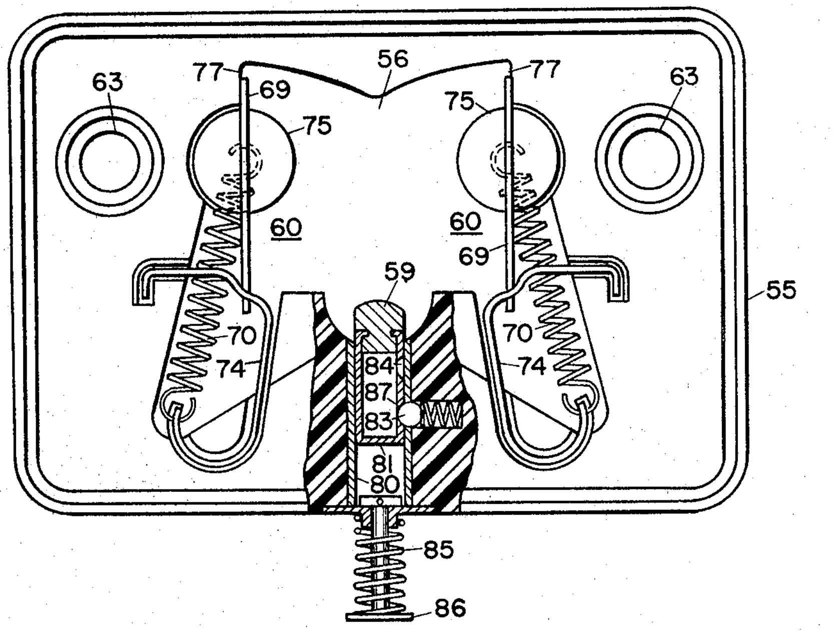
FIG. 3 is a front plan view partially broken away of the strained movement detector of FIG. 2 with the cover member removed.
Figure 11:
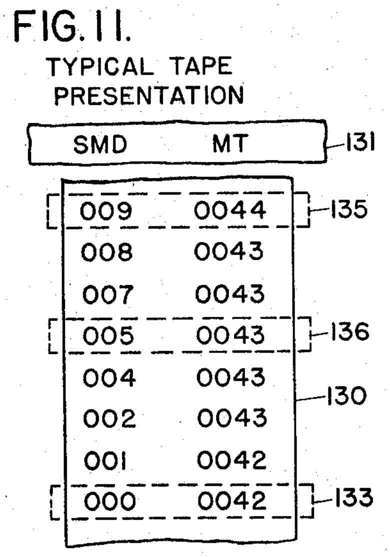
Figure 12:
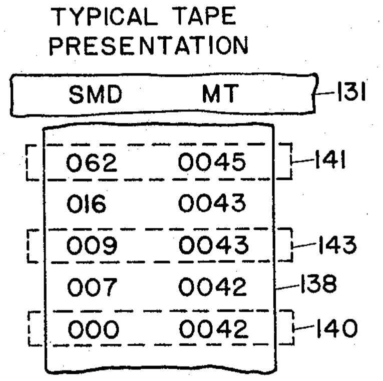
Figure 4:
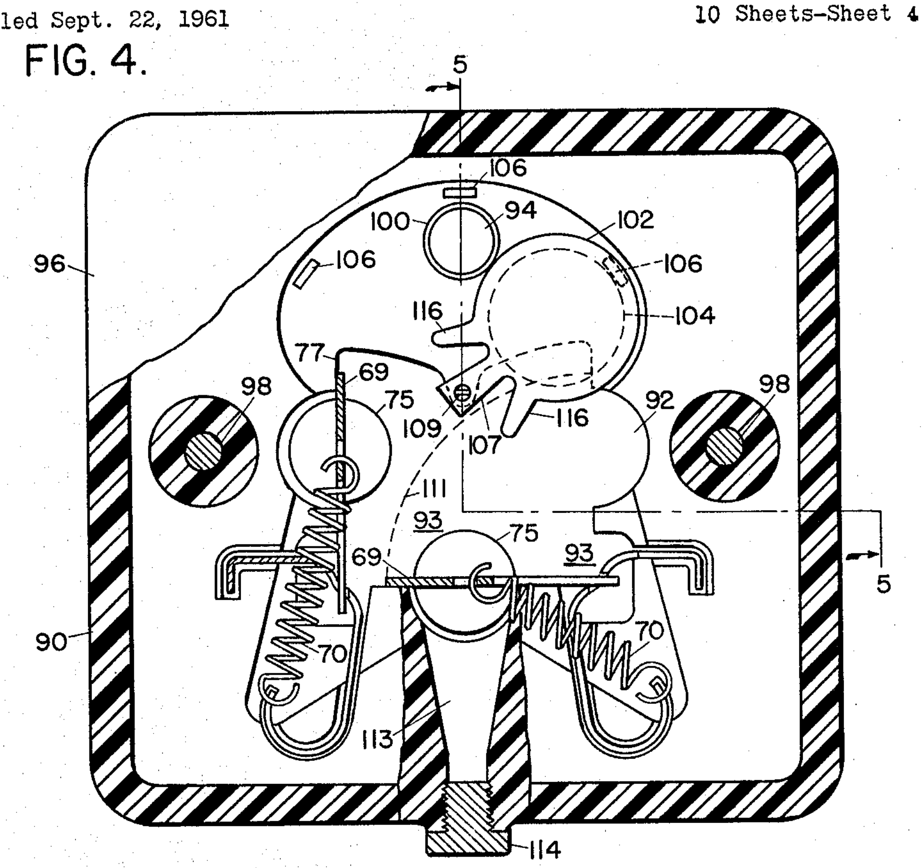
FIG. 4 is a front plan view partially broken away of a second strained movement detector employed in this invention.
Figure 5:
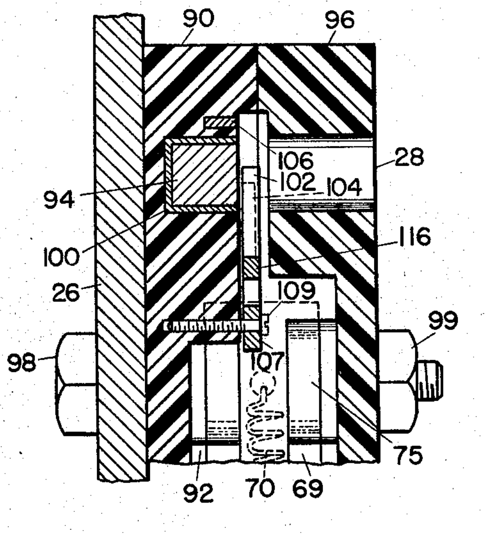
FIG. 5 is a side section view of the strained movement detector shown in FIG. 4 substantially as taken on the line 5—5 of FIG. 4 as viewed in the direction of the arrows.
Figure 8:
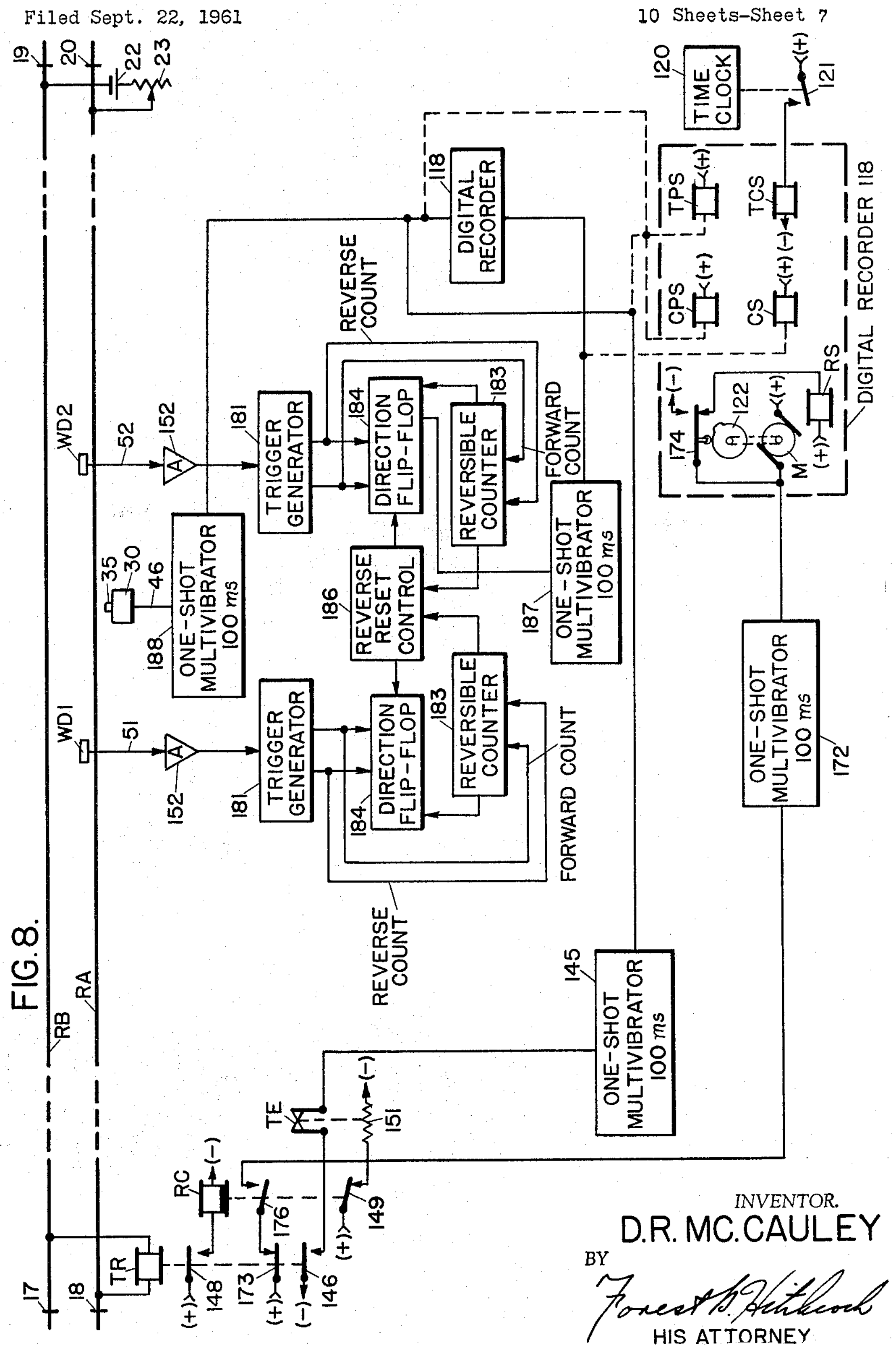
FIG. 8 is a diagrammatic illustration showing the circuit arrangement for a third embodiment of this invention.
Figure 9A:
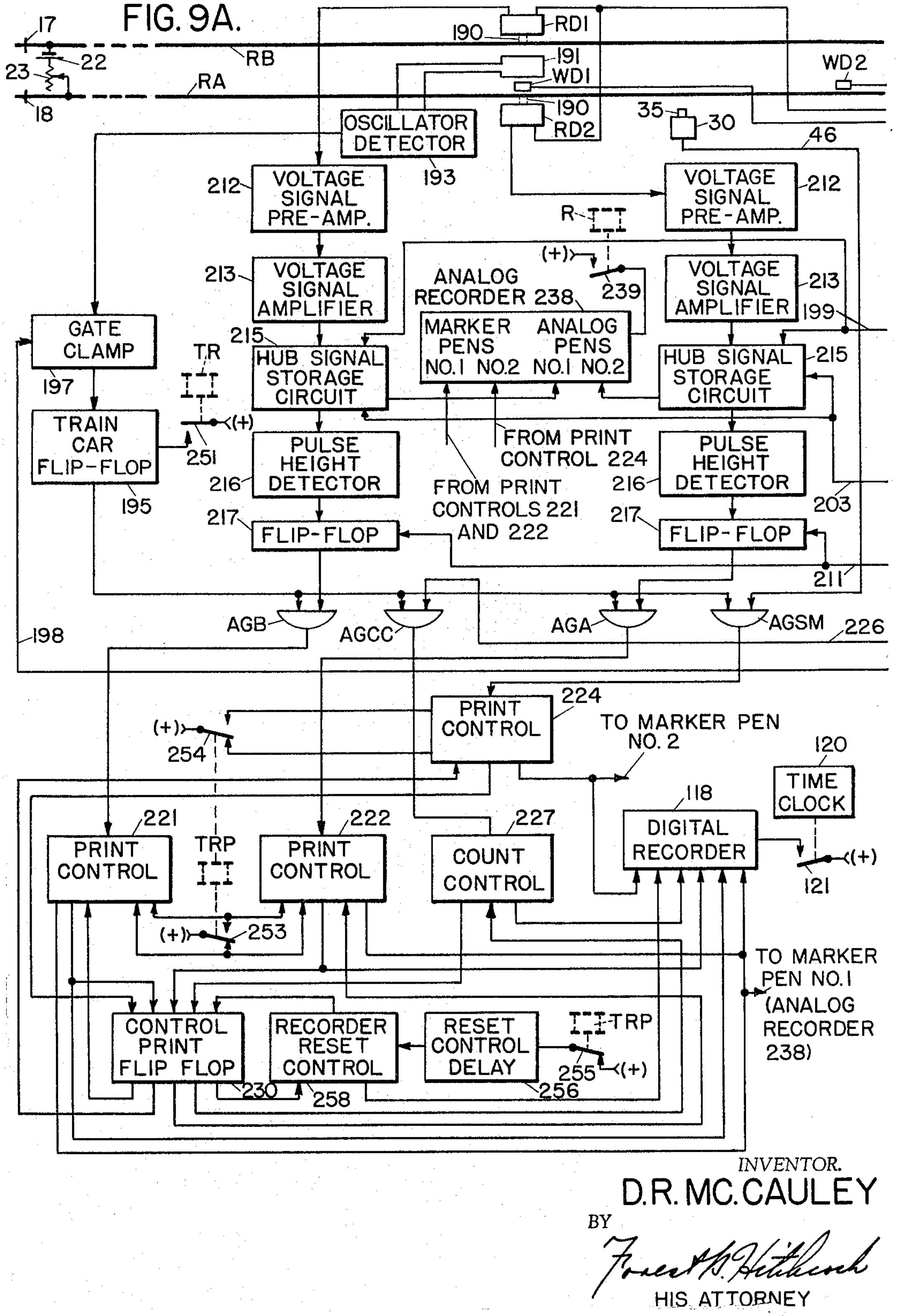
Figure 9B:
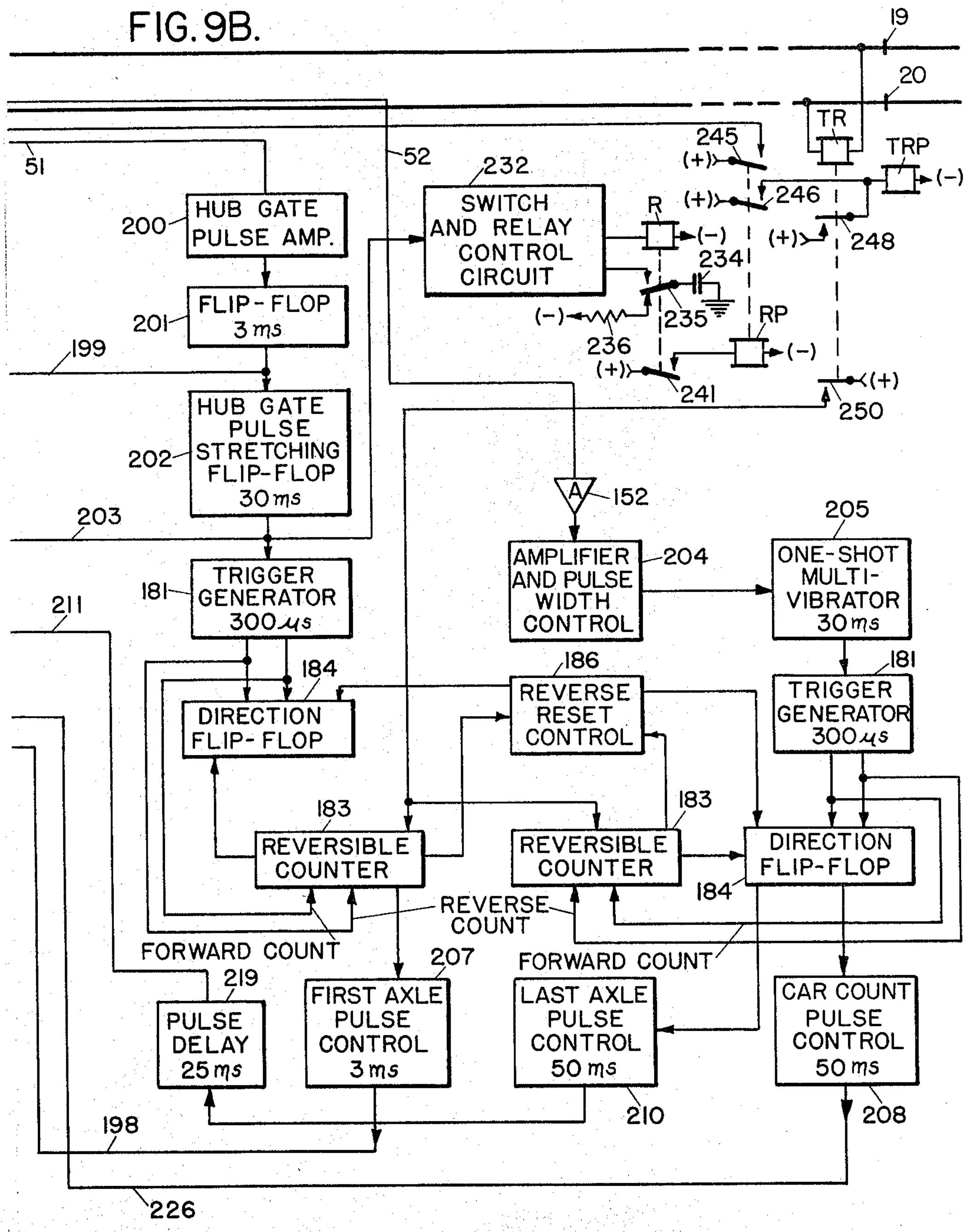
Figure 10:
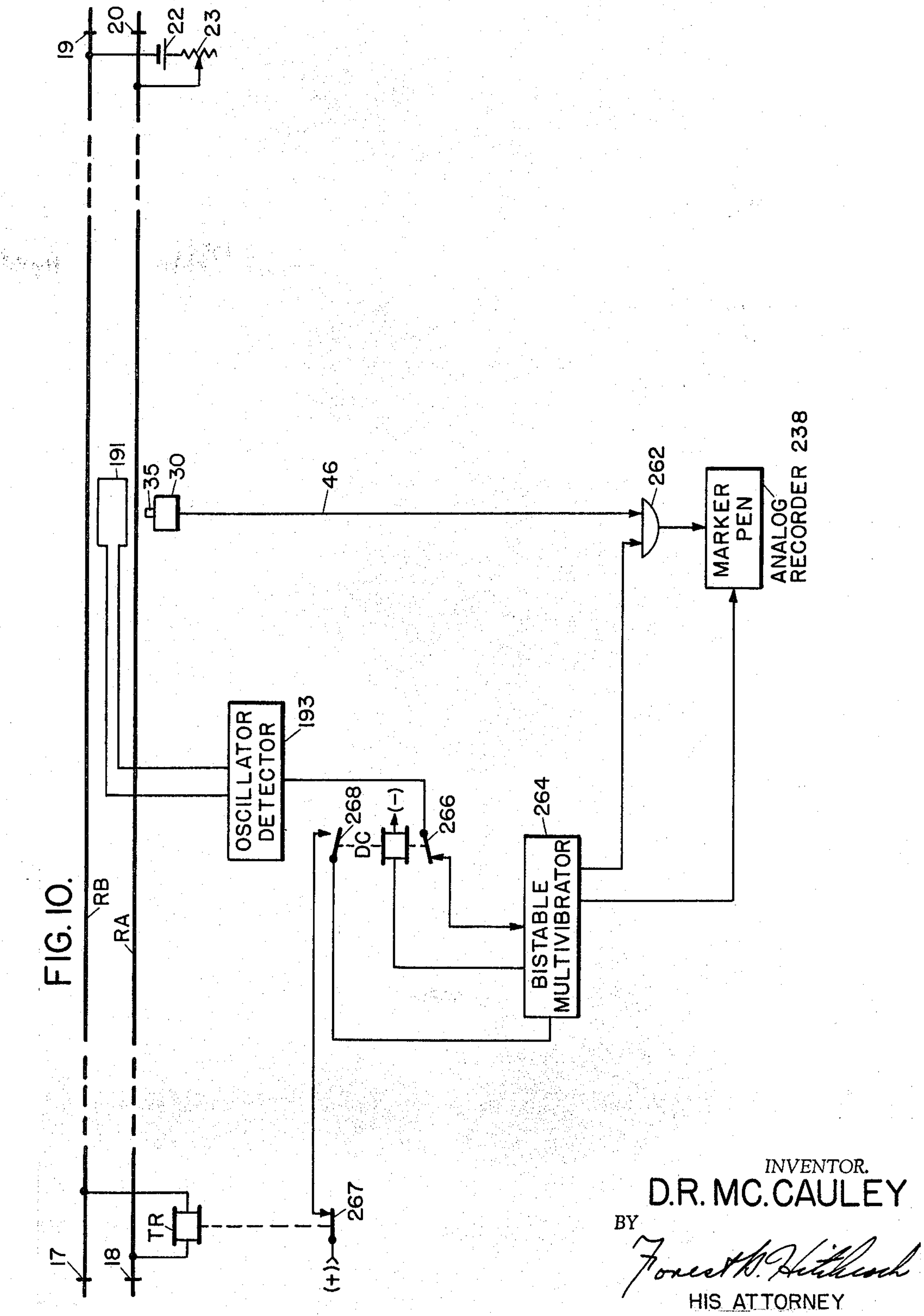

FIGS. 9A and 9B when arranged with FIG. 9A respectively to the left of FIG. 9B is a diagrammatic illustration showing the combined circuits of an overheated journal detection system and the third embodiment of this invention shown in FIG. 8;

FIG. 10 is a diagrammatic illustration showing the circuit arrangement for a fourth embodiment of this invention;

FIG. 11 is an illustration showing a typical tape presentation obtainable when employing the strained movement detector of FIGS. 2 and 3 with each of the embodiments of FIGS. 6, 7, 8 and 9; and FIG. 12 is an illustration showing a typical tape presentation obtainable when employing the strained movement detector of FIGS. 4 and 5 with each of the embodiments of FIGS. 6, 7, 8 and 9.

To simplify the illustrations and facilitate in the explanation, the various parts and circuits constituting the embodiments of this invention have been shown diagrammatically and in block diagram with certain conventional illustrations being employed. The drawings have been made to make it easy to understand the principles and mode of operation rather than to illustrate the specific construction and arrangement of parts that might be used in practicing this invention. The various relays and their contacts are illustrated in a conventional manner, and symbols are used to indicate connections to the terminals of batteries, or other sources of current, instead of showing all of the wiring connections to such terminals. Thus, the symbols (+) and (−) indicate connections to the opposite terminals of a source of potential for suitably operating various relays and electronic circuits and a symbol for a ground connection indicates a connection to a voltage terminal intermediate that of the (+) and (−).

To provide a lucid description of this invention, it is considered expedient to first describe the apparatus located on respective railway cars and then describe the apparatus fixedly located at the wayside in addition to other pertinent apparatus before describing the novel control circuit arrangements with which such apparatuses are used. In this connection, relative placements of apparatuses will be described as well as a general description of pertinent apparatus used with the novel control circuit arrangements.

Figure 1:
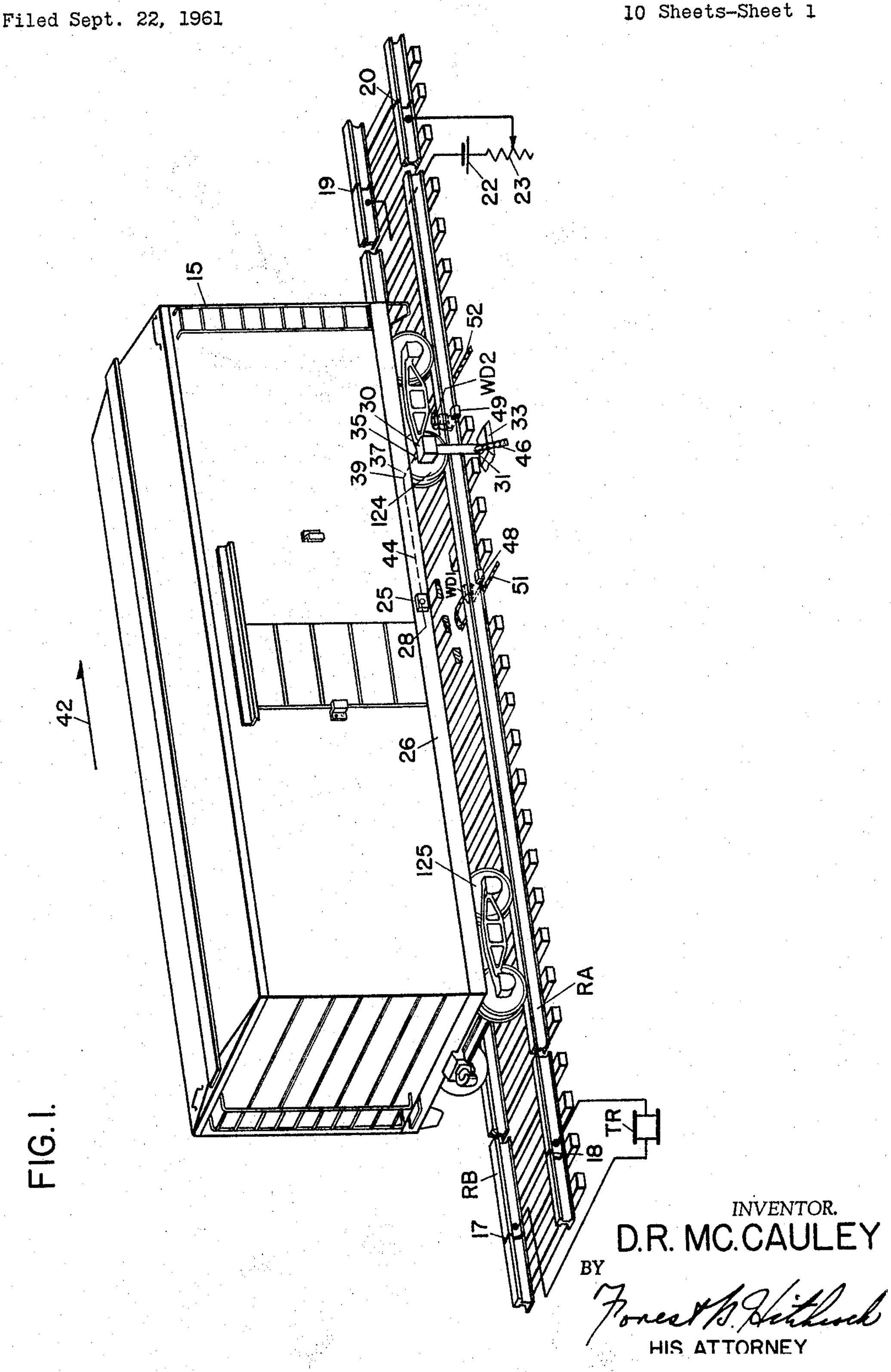
FIG. 1 is a prospective view illustrating the physical arrangement of a track mounted railway car having a strained movement detector located thereon and fixedly located wayside apparatus employed in this invention.

FIG. 1 diagrammatically illustrates in a prospective view the physical location of a freight car 15 located on two rails RA and RB. The placement of such car 15 lies within a track section as defined by insulated joints 17, 18, 19 and 20. A track circuit including track relay TR, a battery 22 and a variable resistor 23 operable in the well known manner by the presence and absence of a train including car 15 further defines the track section.

A strained movement detector 25 is shown to be located on the car 15, and, more particularly, located along the lower structure 26 of such car 15. The illustrated location of detector 25 is only by way of example, and such detector 25 may be located otherwise on car 15 as will be discussed more fully hereinafter. The detector 25 includes a window 28 through which radiation may emanate according to a condition of the detector 25.

Along the wayside, a scintillator 30 is suitably positioned at a predetermined elevation according to the height of a pedestal 31 suitably secured in a base portion 33. The scintillator 30 includes a viewing window 35 through which radiation is received when the detector 25 comes within the line of scan 37 of scintillator 30 and, more particularly, in the area of point 39. With car 15 moving in the direction of arrow 42, detector 25 moves in the direction of dashed lines 44 which intersect the line of scan 37 at point 39, as indicated. The electrical outputs provided by scintillator 30 are taken through a cable 46.

In order that the electrical outputs from scintillator 30 may be properly employed to give an indication representative of respective cars in a moving train, wheel detectors WD1 and WD2 are employed and attached to the rail RA by means of respective clamps 48 and 49. These detectors WD1 and WD2 are spaced a distance of nine feet apart along the rail RA and are employed to each provide an electrical output pulse for a wheel traveling thereover so as to operate the control circuits of FIGS. 6 through 9, as will be discussed hereinafter. For the present, however, it is noted that each of the wheel detectors WD is a track instrument of the type employing a permanent magnet with an associated iron core coil affixed to, in this illustration, rail RA by the clamps 48 and 49. In operation, as the wheel flange of each wheel passes through an inductive coupling relationship made with the coil, there is a distinctive change in the flux which is provided by the permanent magnet and which links with the turns of the coil. As a result, a voltage is induced in the coil and this voltage is applied respectively to output cable wires 51 and 52 of respective wheel detectors WD1 and WD2.

The scintillator 30 employed herein has a well known construction which includes, generally speaking, a radiation sensitive element which is adapted to produce light scintillations in response to the subjection thereof to incident nuclear radiation and a photomultiplier tube positioned adjacent to the radiation sensitive element which transforms the light scintillations into electrical output pulses. In general, a scintillator provides a positive-going output pulse during normal conditions, i.e., when such scintillator is not subjected to incident nuclear radiation, and provides a negative-going output pulse during each instance when the scintillator is subjected to incident nuclear radiation. For purposes of description, it is assumed that the scintillator 30 shown in FIG. 1 provides electrical output pulses of this generally described character.

It has been mentioned above that wheel detectors WD1 and WD2 are spaced along the rail RA a distance of nine feet apart. This location may be any convenient location within the track section as defined by the insulating joints 17–20. With such spacing of nine feet, electrical output pulses may be taken from the wheel detectors WD1 and WD2 as railway car or locomotive wheels travel thereover with the signals being employed to provide a counting pulse for each locomotive or railway car wheel. The distance of nine feet between the wheel detectors WD1 and WD2 is especially selected in view of the distances between axles on railway car trucks and axle distances with respect to locomotives. With respect to a railway car, it is well known that on two axle trucks the axles are separated a distance of approximately five feet six inches apart. Also, on three axle trucks, the outside axles are separated a distance within the range of seven feet two inches to nine feet. With respect to a locomotive, the distance between axles in a group is in the order of eight feet four inches. The distance between trucks on railway cars and between groups of axles on locomotives is always a distance greater than nine feet. The electrical output signals then derived from actuated wheel detectors WD1 and WD2 are employed to control counting circuits which provide an output pulse for each car passing over such wheel detectors WD. This particular spacing feature of the wheel detectors WD1 and WD2 is described and claimed in the application Ser. No. 110,528, filed on May 16, 1961, now Patent No. 3,177,359 issued April 6, 1965, in the names of Henry C. Sibley et al.

Inasmuch as it is desirable to have a strained movement detection system which is operable for both directions of train travel, certain conditions must be taken into account when placing the scintillator 30 with respect to wheel detectors WD1 and WD2. These conditions include the relative placement of the strained movement detector on the railway car, the time required for car counts to register, and the speed of the moving train.

As shown in FIG. 1, the scintillator 30 is illustrated as being placed substantially midway between wheel detectors WD1 and WD2. With this relative placement of scintillator 30 and wheel detectors WD1 and WD2, the strained movement detector 25 must of necessity be located approximately in the position shown with respect to wheels 124 and 125. More particularly, the distance between detector 25 and the closest axle for wheel 124 must be sufficient to allow the car count pulse to be produced for the particular car on which the detector 25 is located before such detector 25 passes the scintillator location. Taking into account the above mentioned conditions, the distance between the axle for wheel 124 and the detector location may be in the order of ten feet. It should be understood, however, that this distance of detector location is variable according to the location of the strained movement detection system of this invention, i.e., it may be located at the entrance or exit of a classification yard where train speed is a minimum or some location between classification yards where train speed is a maximum, as well as to the rapidity of car count registration. It will be appreciated that the detector location on a railway car along its longitudinal length can be extensively variable.

The strained movement detector 25 may be of the type shown in FIGS. 2 and 3 where included radioactive material is allowed to appear in the window 28 during unactuated conditions, but is not permitted to appear in such window 28 during actuated conditions of such detector. On the other hand, the strained movement detector 25 may be of the type shown in FIGS. 4 and 5 where a radioactive material is permitted to appear in the window 28 when such detector is in an actuated condition, but not permitted to appear in such window 28 when such detector is unactuated.

The structure for the first type of strained movement detector is shown in FIGS. 2 and 3. Referring to FIG. 2, an exploded perspective view of the detector is illustrated for conveniently describing the structure thereof. More particularly, a base member 55 having a thickness such that it can accommodate a hollowed out portion 56 for placement of the radioactive material 59 and two actuatable apparatuses 60 (only one apparatus 60 illustrated here). Such apparatus is enclosed by a cover member 61 which is secured to the base member 55 and the lower portion 26 of car 15 by suitable bolts (not shown) placed through the holes 63. The radioactive material 59 is exposed through the window 28 cut in the cover member 61 which permits radiation therethrough when the cover member 61 is secured to the base member 55 in the secured position of the detector 25.

The actuatable apparatus 60 is comprised of a lever arm 69 which is held in an unactuated position by a coil spring 70 having one of its ends supported in a hole 72 cut in one end of a supporting bracket 74. At the end of the lever arm 69 furthest from the supporting bracket 74, weighted portions 75 are fixedly connected thereto. These weighted portions 75 may be made of any suitable material provided they have at least a coating of lead which is employed to prevent radiation from emanating through the window 28 in the actuated position of lever arm 69. In the unactuated position of lever arm 69, such arm 69 rests against the stop lug 77, and in the actuated position of lever arm 69, the weighted portions 75 are adapted to move the radioactive material 59 within a lead shield 80 as the support 81 for the radioactive material 59 is displaced to the position where the biased holding ball 83 is placed in the holding recess 84 formed in the supporting member 81 (see FIG. 3). With reference to FIG. 3, a manual reset 86 spring biased to one position by the spring 85 may be controlled to move the supporting member 81 to the position where the biased holding ball 83 is placed in the holding recess 87 formed in supporting member 81. It is noted that FIG. 2 only includes one such actuatable apparatus 60 as supported in the hollowed out portion 56, but includes similar recesses for a similar actuatable apparatus 60 as shown more clearly in FIG. 3. The absence of such similar apparatus 60 in FIG. 2 permits a clearer description when viewed with respect to one such apparatus 60.

Each of the actuatable apparatuses 60 is actually an over center device in that the lever arm 69 is pivotable according to the movement of the weighted portions 75 to an actuated position. As noted in FIG. 2, lever arm 69 is pivotally engageable with the supporting bracket 74 at the notched portions 89. It is assumed that the coil spring 70 has a selectable restraining force so as to maintain the weighted portions 75 and lever arm 69 in the unactuated position as shown during normal conditions, but allows the weighted portions 75 and lever arm 69 to be pivotally movable to the actuated position when the railway car carrying the strained movement detector is subjected to an excessive strained movement of at least a predetermined force.

Referring to FIG. 3, it may be seen more clearly how the weighted portions 75 for each of the actuatable apparatuses 60 are employed to displace the radioactive material 59 and its supporting member 81. It is also noted that the two actuatable apparatuses 60 are arranged in the manner shown in FIG. 3 so as to provide an actuation of one actuatable apparatus 60 for each direction of longitudinal travel where an excessive strained movement of the supporting railway car is experienced.

The structure for the second type of strained movement detector is shown in FIGS. 4 and 5. Referring to FIG. 4, a front plan view partially broken away of the detector is illustrated for conveniently describing the structure thereof. More particularly, a base member 90 is provided having a thickness such that it can accommodate a hollowed out portion 92 for placement therein of two actuatable apparatuses 93 and a radioactive material 94. Such apparatus is enclosed in a cover member 96 which is secured to the base member 90 and the railway car portion 26 by bolts 98 and nuts 99 (only one of each shown in FIG. 5). It is noted here that each of the actuatable apparatuses 93 is similar in construction and operation to each of the actuatable apparatuses 60 described above. The radioactive material 94 is located in a lead shield 100 and is normally covered by a shield 102 which includes the lead portion indicated by the dashed lines 104, or such shield 102 may be constructed of lead in its entirety. The shield 102 is arranged to be movable to three positions, one of which is directly in front of radioactive material 94 and two other positions which are out of alignment with the radioactive material 94 and the viewing window 28 (see FIG. 5). In each of such positions, the shield 102 is held in position by a permanent magnet 106 at one end thereof and supported at the other end thereof on a finger 107 by a supporting bolt 109 suitably secured in member 90.

As shown in FIGS. 4 and 5, one of the actuatable apparatuses 93 is shown in an actuated position while the shield 102 is shown to be displaced from in front of the radioactive material 94. This is provided to show how the lever arm 69 is employed to move the shield 102 as it is controlled from an unactuated position to an actuated position through the arcuate movement indicated by dashed lines 111. It is noted here that lever arm 69 engages the side of finger 107 to movably control the shield 102 to the position shown. In resetting the actuatable apparatus 93, it is proposed that an elongated member such as a rod (not shown) be inserted in the channel 113 after removing a threaded knob 114 to push the actuatable apparatus 93 to the position where coil spring 70 is effective to return apparatus 93 to an unactuated position. In this operation, lever arm 69 engages the finger 116 of shield 102 to movably rotate shield 102 to the position where radiation emanating from radioactive material 94 is shielded from the viewing window 28. Each of the actuatable apparatuses 93 is similarly controlled but for opposite directions of longitudinal travel.

In each of the embodiments diagrammatically illustrated in FIGS. 6–9, a digital recorder 118 is employed to register as well as record information representative of railway cars each having an actuated or unactuated strained movement detector located thereon according to the particular strained movement detector employed. Generally speaking, the digital recorder 118 includes a time control solenoid TCS which is adapted to be intermittently energized according to the operation of a time clock 120 through a front contact 121 which functions to establish the time. A time print solenoid TPS is included and adapted to be energized when a train leaves the detection zone and for each monitored strained movement detector actuated or unactuated according to the type employed with the particular embodiments of this invention for effecting a time print in, for example, twenty-four hour time. Several separate units each including a count solenoid CS adapted to be energized each time a car count is registered and a count print solenoid CPS adapted to be controlled for each actuated or unactuated strained movement detector monitored according to the particular embodiments of this invention may be employed according to the information desired, as will be more apparent from the description presented hereinafter.

Generally speaking, printing of the car count registrations and time is accomplished through solenoid operated platens which are adapted to force typewriter-like paper and carbon into contact with included printing heads. Upon release of a particular solenoid, an included ratchet mechanism advances the paper one printing position in order that the next printing cycle may be effected, each of such printing cycles requiring a time of operation in the order of one-hundred milliseconds. In this type of digital recorder, is possible to supply a number of separate solenoids and platens to provide selective printing of included individual printing heads. It is noted that this type of digital recorder may be similar to model ZDG1 manufactured by the Presin Company located in Santa Monica, California.

It is also noted that this type of digital recorder includes reset control apparatus which becomes effective, in the embodiments of this invention, at a predetermined time after the total car count registration is printed when a train leaves the detection zone. The control apparatus for effecting this reset control includes a reset solenoid RS, a motor M, and a cam 122 controlled by the motor M, the operation of these apparatuses being explained in more detail hereinafter.

Before discussing in detail the circuit arrangements of the embodiments disclosed in FIGS. 6–9, it is considered expedient to first consider the typical tape presentation as illustrated in FIGS. 11 and 12. The tape presentation shown in FIG. 11 is similar for each of the embodiments of FIGS. 6–9 when using the strained movement detector shown in FIGS. 2 and 3. The tape presentation shown in FIG. 12 is typical for each of the embodiments of FIGS. 6–9 when using the strained movement detector of FIGS. 4 and 5.

Referring to FIG. 11, a tape 130 is shown as having two columns of indications which may be identified on a portion 131 of the digital recorder 118 to be the monitoring time MT and the strained movement detection SMD. The indications on the tape are representative of a trian having entered a track section where one of the embodiments of FIGS. 6–9 is employed to monitor passing trains. The indications enclosed in dashed lines 133 represent the entrance of a train by the "000" indication at the time of "0042." Similarly, the indications enclosed in dashed lines 135 indicate the number of railway cars and locomotives within the train as "009" with such train leaving the track section at the time of "0044." Each of the other indications such as the indications enclosed by dashed lines 136 indicate the detection of a car having an unactuated strained movement detector numbered from the initial locomotive and the time of detection. For example, indications enclosed in dashed lines 136 represent as the "005" car located fifth in sequential position within the train (including any locomotives) having an unactuated detector with the time of detection being "0043."

Referring to FIG. 12, a similar tape presentation is shown wherein a tape 138 has two columns of indications as identified on the portion 131 of digital recorder 118 similar to that shown in FIG. 11. The indications enclosed by dashed lines 140 and 141 respectively indicate the time of entrance and exit of a train into and out of a defined track section. The dashed lines 143 provide a car count indication of "009" which represents the car which is located ninth in sequential position within the train (including any locomotives) having an actuated strained movement detector with the time of detection being "0043."

Figure 6:
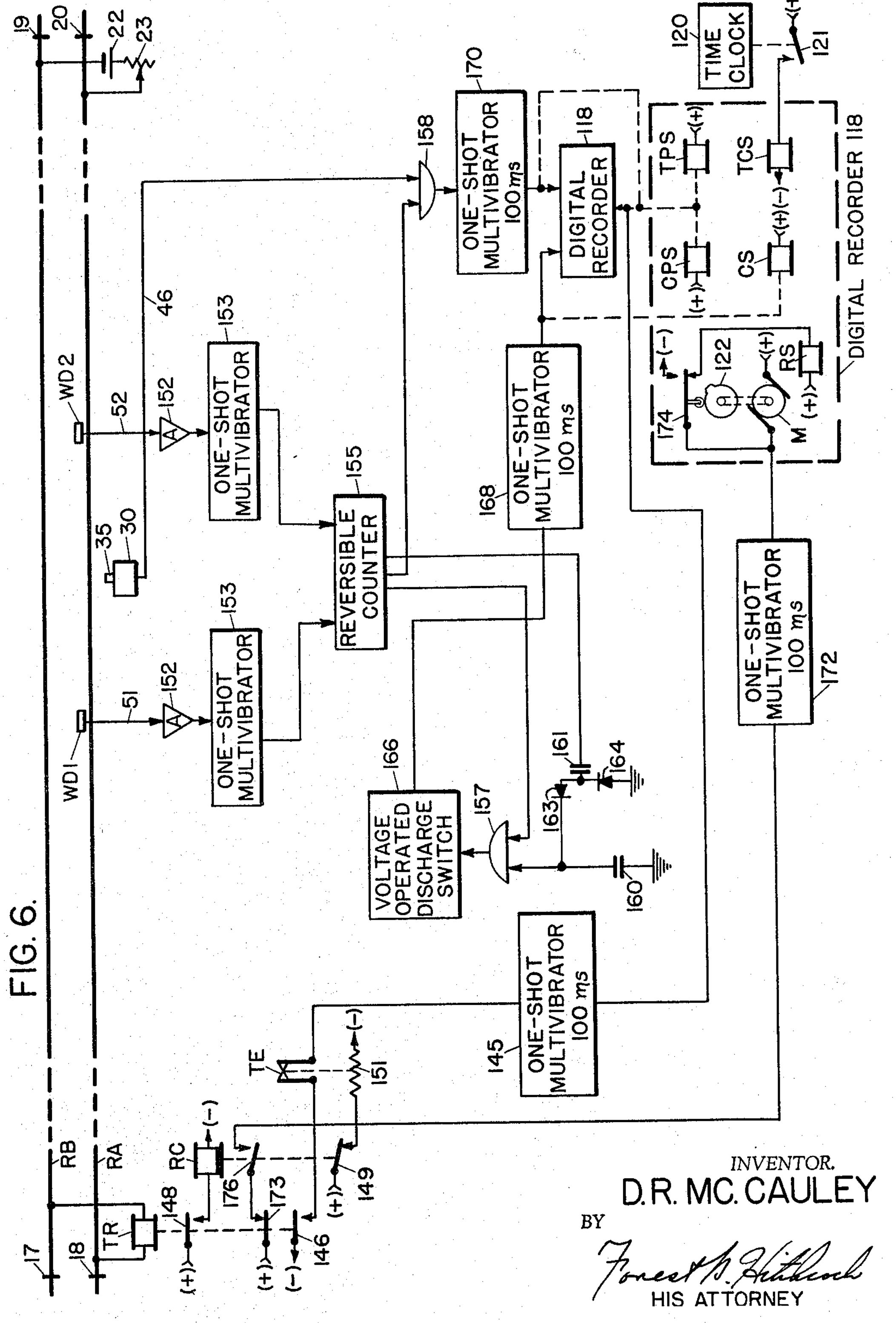
FIG. 6 is a diagrammatic illustration showing the circuit arrangement of one embodiment of this invention.
Figure 7:
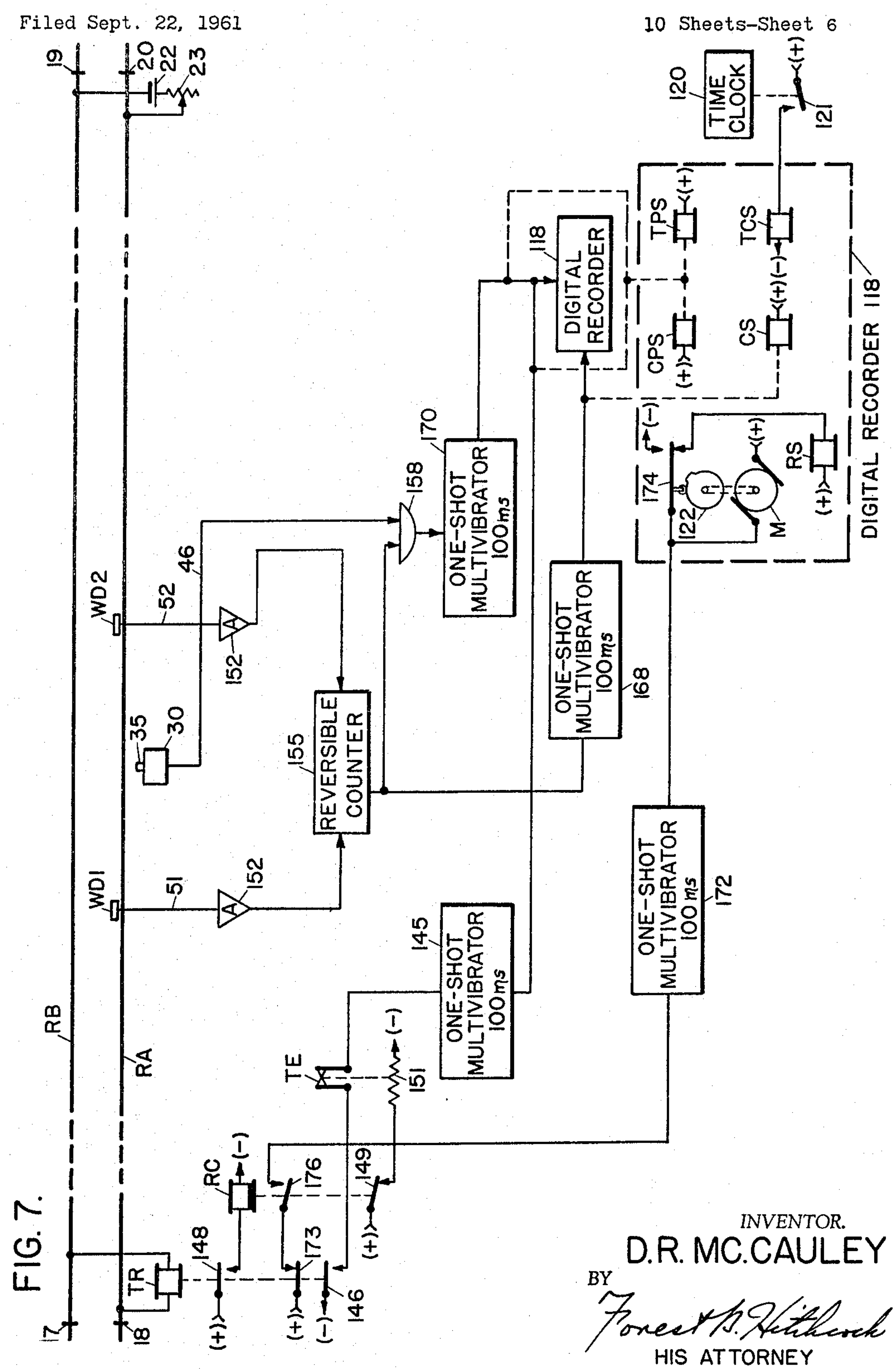
FIG. 7 is a diagrammatic illustration showing the circuit arrangement for another embodiment of this invention.

With respect to the indications of the car counts as illustrated in FIGS. 11 and 12, each indication is representative of the car position taken sequentially within the train which number includes all prior positioned locomotives which may be the initial locomotive only or may include others, this type of indication being characteristic of the embodiments of FIGS. 6, 7 and 8. Employing the embodiment of FIG. 9, the indications illustrated are representative of the number of cars and locomotives excluding the initial locomotive and one or more other locomotives which may immediately follow the initial locomotive. This will be described more fully when considering the circuit arrangement of the embodiment of FIG. 9.

*Description for circuit arrangement of FIG. 6*

Referring to the circuit arrangement illustrated in FIG. 6, it is noted that the rails RA and RB are illustrated diagrammatically. The track section is defined diagrammatically by the insulating joints 17–20, while further being defined by the track circuit including relay TR, battery 22 and variable resistor 23. The wheel detectors WD1 and WD2 are illustrated as being adjacent rail RA and spaced apart while the scintillator 30 is illustrated as being located substantially midway between such detectors WD1 and WD2.

The digital recorder 118 is controlled according to the operation of the track circuit when a train appears in the track section to provide the indications representative of the train entrance in the manner noted above. More particularly, a negative (−) potential is supplied to a one-shot multivibrator 145 through back contact 146 of track relay TR and through contacts of a time element TE. The multivibrator 145 is controlled from a normal condition to an opposite condition for approximately one-hundred milliseconds during which time a negative-going output signal is produced and provided to control the relays CPS and TPS to effect the printing operation. To permit the multivibrator 145 to return to an original condition, the contacts of time element TE are opened after a reset control relay RC is energized by a circuit extending from (+), through back contact 148 of relay TR, through the winding of relay RC, to (−). A circuit extending from (+), through back contact 149 of relay RC, through a resistor 151 included with time element TE, to (−) normally holds the contacts of time element TE in electrical engagement, while the opening of this circuit causes such contacts to become opened after a predetermined time.

The electrical output signals derived from each of the wheel detectors WD1 and WD2 are supplied to an amplifier 152 where they are amplified and then further supplied to a one-shot multivibrator 153, each such amplified signal being effective to cause the multivibrator 153 to be controlled from a normal to an opposite condition for a limited time. A reversible counter 155 is controlled by the outputs supplied from multivibrators 153 in their opposite operating conditions with such outputs respectively causing opposite direction counting by the counter 155. That is, the electrical output signals derived from wheel detector WD1 cause the counter 155 to count in one direction such as in a positive or forward direction, while the electrical output signals derived from wheel detector WD2 cause the counter 155 to count in the opposite direction such as a negative or reverse direction. In this operation of counter 155, it is assumed that such counter 155 has a normal zero position from which counts may be registered either in a positive or negative direction and irrespective of the occurrence of output signals derived from detectors WD1 and WD2.

In the zero counting position of reversible counter 155, a negative-going output signal is supplied therefrom to AND gate 158. When reversible counter 155 is in a counting position other than the zero counting position, a positive-going output signal is derived from the zero counting position and is supplied to AND gate 157. When reversible counter 155 is in a counting position other than its zero counting position, a negative-going output signal is produced and supplied to a storage counter comprised of capacitors 160 and 161 and diodes 163 and 164. The negative-going output signals as produced by counter 155 represents the counting of wheels passing wheel detectors WD1 and WD2.

From the description provided above with respect to FIG. 1, it will be recalled that it is required to register a car count prior to the time that scintillator 30 monitors a detector 25 located on a passing car. This is accomplished in the present circuit arrangement by permitting the reversible counter 155 to provide a negative-going output signal for each wheel passing either wheel detector WD1 or wheel detector WD2 where storage of all such signals is provided until all wheels for one side of the train comprising the trailing truck on one railway vehicle and the leading truck of a succeeding railway vehicle pass both wheel detectors WD1 and WD2. In this connection, inasmuch as some railway cars have two axle trucks while other railway cars have three axle trucks, four to six wheels may successively pass wheel detectors WD1 and WD2 according to successive railway vehicle coupling. Irrespective of the direction of train travel, each group of four to six wheels passing the wheel detectors WD1 and WD2 in succession cause the reversible counter 155 to provide a plurality of negative-going output signals.

The reversible counter 155 may be of the type shown and described in the above mentioned pending application Ser. No. 110,528. More particularly, the reversible counter employed in such pending application Ser No. 110,528 includes a plurality of electronic devices and related circuit elements which are so arranged as to count in a forward or reverse direction in accordance with the application of a positive (+) signal. In operating between counting positions of such reversible counter, only the electronic device allotted to a given counting position conducts irrespective of the direction in which the counter is being operated. Although the reversible counter shown in such pending application Ser. No. 110,528 is operated to count from a zero counting position in a forward direction and then in a reverse direction to indicate counts of "one," "two" or "three," it is suggested for the purposes of this invention that additional stages be employed so that the counter may also be operated from a zero count position in a reverse counting direction.

Each of the plurality of negative-going output signals representing a group of wheels passing wheel detectors WD1 and WD2 is supplied to the storage counter including capacitors 160 and 161. More particularly, each such negative-going signal causes capacitor 161 to be charged through diode 164 to ground. At the conclusion of each such negative-going output signal, capacitor 161 is discharged through the series circuit including diode 163 and capacitor 160 until the respective voltages across the capacitors 160 and 161 are equal. This operation is repeated for successively received negative-going output signals for a given group of wheels passing the wheel detectors WD1 and WD2 in succession. It is noted that for each successively received negative-going output signal, capacitor 161 is charged less than it is charged for the preceding negative-going signal received. Thus, capacitor 160 is charged in steps with each successive step causing capacitor 160 to be charged a smaller amount.

Reversible counter 155 is operated again to a zero count position when all of the wheels of a given group of wheels have passed wheel detectors WD1 and WD2. In such zero count position, a positive-going output signal is supplied from counter 155 to AND gate 157 which permits the charge on capacitor 160 to be supplied to switch 166. Switch 166 may take the form of a blocking-oscillator comprised of a triode type tube and related elements which functions in response to the application of the charge on capacitor 160 to provide a negative-going output signal. In this respect, it is suggested that the switch 166 be responsive to a signal level represented by the charge on capacitor 160 as caused by at least four wheels comprising a group passing wheel detectors WD1 and WD2. According to the discharge of capacitor 160 when connected to switch 166, the negative-going output signal produced by switch 166 is limited in time duration. This negative-going output signal produced by switch 166 is supplied to one-shot multivibrator 168 which is controlled from a normal operating condition to an opposite operating condition for a period of one-hundred milliseconds. During such operation of multivibrator 168, a negative-going output signal taken therefrom is supplied to the digital recorder 118 and, more particularly, to the count solenoid CS for effecting a count registration of the railway car or locomotive appearing over detectors WD1 and WD2. This operation is repetitive for each railway car or locomotive of the passing train.

After reversible counter 155 is controlled to its zero count registering position where a negative-going output signal is produced and supplied to AND gate 158, the scintillator 30 may be controlled to provide a negative-going output signal in the manner described above as it monitors a detector 25 located on a passing railway car. Such negative-going output signal may be representative of either an unactuated strained movement detector such as shown in FIGS. 2 and 3 or may be representative of an actuated strained movement detector such as shown in FIGS. 4 and 5. In any event, the negative-going output signal produced by scintillator 30 is supplied through the AND gate 158 to a one-shot multivibrator 170 which is controlled from a normal condition to an opposite condition for a period of one-hundred milliseconds. During such time, a negative-going output signal derived therefrom is supplied to one side of the solenoids CPS and TPS in recorder 118 to effect a printing of the car count registered as well as the registered time.

The digital recorder 118 is controlled when the passing train is detected as having left the track section so as to be in readiness for the next train entering the track section. When such passing train leaves the track section, track relay TR is once again energized which causes a one-shot multivibrator 172 to be operated from a normal condition to an opposite condition for a period of one-hundred milliseconds as the circuit extending from (+), through front contact 173 of track relay TR, through front contact 176 of relay RC, to the input of multivibrator 172 is completed until relay RC is deenergized according to its indicated slow release characteristics. During such opposite condition of multivibrator 172, a negative-going output signal is produced thereby and supplied to the recorder 118 and, more particularly, to one side of motor M and one side of a reset solenoid RS through a cam controlled contact 174. The motor M is thus energized which causes a controlled cam 122 to be rotated thereby for a period of time sufficient to permit resetting of the count registrations to zero before the cam 22 is rotated to the position where it engages contact 174 and interrupts the circuit to solenoid RS. The motor energizing circuit established by the negative-going output signal supplied from multivibrator 172 is interrupted when such multivibrator operates to an original condition, but an additional circuit completed through contact 174 when in an engaged position to (—) permits the control of cam 122 as motor M is maintained energized to the position where it is out of engagement with contact 174 and motor M is deenergized.

*Description for circuit arrangement of FIG. 7*

The circuit arrangement diagrammatically illustrated in FIG. 7 is similar to that shown in FIG. 6. The difference resides in the manner of counting the cars and locomotives of a passing train.

It was mentioned in connection with FIG. 6 that a car count pulse is produced by switch 166 when the charge on capacitor 160 is applied thereto. The charge on capacitor 160 acting on switch 166 is suggested to be caused by at least four wheels in a group passing wheel detectors WD1 and WD2. Thus, the locomotive does not have a count registered therefor in that its front truck includes only two wheels. In FIG. 7, however, it is contemplated that the locomotive be counted so that the digital count registered by digital recorder 118 includes the locomotive.

Referring to FIG. 7, it is seen that reversible counter 155 is operated in forward and reverse counting directions directly from the outputs of amplifiers 152. In addition, reversible counter 155 is connected directly to one-shot multivibrator 168.

In operation, a positive-going output signal supplied from counter 155 when such counter 155 is operated from its zero count position by an output from either wheel detector WD1 or WD2 caused by the passage of a first wheel of a group is employed as the "car count pulse" which causes multivibrator 168 to operate for a period of one-hundred milliseconds, thus permitting count storage solenoid CS to be operated for storing the car count pulses in recorder 118. When counter 155 is in its zero counting position as operated thereto by the last of a group of passing railway vehicle wheels, a negative-going output signal is supplied to AND gate 158 which operates AND gate 158 to permit the passage of a negative-going signal supplied from the scintillator 30. It is noted here that the initial operation of reversible counter 155 causes the positive-going output signal to be supplied for operating multivibrator 168, while such multivibrator 168 as shown in FIG. 6 is not operated until all of the wheels in a given group of wheels have passed both wheel detectors WD1 and WD2.

*Description for circuit arrangement of FIG. 8*

The circuit arrangement of FIG. 8 is similar to those of FIGS. 6 and 7 but illustrates a still different counting arrangement than those shown in FIGS. 6 and 7. This counting arrangement shown in FIG. 8 may be employed where the last axle of the trailing truck on one car or locomotive and the first axle of the leading truck on the succeeding car or locomotive are spaced a distance of less than nine feet which is less than the spacing between detectors WD1 and WD2.

Referring to FIG. 8, the electrical output signals derived from either wheel detector WD1 or WD2 are separately supplied to amplifier 152 where they are amplified and then supplied to a trigger generator 181. The output from each trigger generator 181 may be a negative-going signal of a predetermined duration which is supplied to a respective reversible counter 183 according to the operating conditions of respective direction flip-flops 184. For one operating condition of a flip-flop 184, the negative-going signal from trigger generator 181 may be employed to cause the respective counter 183 to count in a positive direction, while the opposite operating condition of such flip-flop 184 may cause the negative-going signal from trigger generator 181 to cause the respective counter 183 to count in a negative direction. Such negative-going signals derived from generators 181 may respectively be supplied to the counters 183 to effect such operations over the buses indicated as FORWARD COUNT and REVERSE COUNT. When each of the counters 183 is operated to a similar counting position other than the zero counter position, an output signal derived from each counter 183 is supplied to reverse reset control 186 which is employed to control flip-flops 184 from a normal operating condition to an opposite operating condition. This occurs when the counters 183 register coincidence counts which is representative of a similar number of wheels having passed over both detectors WD1 and WD2. In the return to a normal operating condition of flip-flop 184 associated with wheel detector WD2, a positive-going spike results from differentiation of the trailing edge of a negative-going signal produced by flip-flop 184 and is applied to one-shot multivibrator 187 for causing the operation thereof to be effective from a normal condition to an opposite condition for a period of time in the order of one-hundred milliseconds. During such period of time, count solenoid CS is operated to register a count corresponding to the car or locomotive positioned sequentially within the passing train.

In such opposite operating condition of the flip-flops 184, the negative-going pulses from generators 181 are supplied to the counters 183 over the REVERSE COUNT buses to cause respective counters 183 to count in a reverse direction. When each of the counters 183 is operated to a zero position, an output pulse is supplied to the respective flip-flop 184 for operating it from its opposite operating condition to its normal operating condition where the pulses supplied from generator 181 are effective over the FORWARD BUS to operate counter 183 in a forward or positive direction.

The output from scintillator 30 may be employed to operate a one-shot multivibrator 188 for controlling solenoids CPS and TPS in digital recorder 118 to effect the printing of the car count number and time. The absence of an AND gate such as AND gate 158 mentioned above requiring both a car count pulse and the scintillator output pulse for operating a recorder 118 is not required if it is assumed that the detector 25 is located on the car 15 a sufficient distance from the wheels 124 and 125.

*Description for circuit arrangement of FIG. 9*

It is proposed in the circuit arrangement diagrammatically illustrated in FIGS. 9A and 9B to combine the circuit arrangement of FIG. 8 with a system for recording journal temperature information of the type disclosed in the pending application, Ser. No. 110,528, mentioned above. In such combination, it is necessary to co-ordinate the outputs derivable from the strained movement detection system as embodied in FIG. 8 with outputs for detected journal temperature information in order to provide only one recording for each passing train.

Referring to FIGS. 9A and 9B, the rails RA and RB are diagrammatically illustrated with the track section being defined by the insulating joints 17–20 and the track circuit including track relay TR, battery 22 and resistor 23. Wheel detectors WD1 and WD2 are spaced along rail RA a distance of nine feet as mentioned above. The scintillator 30 is positioned substantially midway between wheel detectors WD1 and WD2 at the track side. Radiometer detectors RD1 and RD2 are positioned relative to wheel detector WD1 with each having a line of scan indicated at 190 normal to respective rails RA and RB. A coil 191 is located between rails RA and RB and between detectors RD1 and RD2.

The coil 191 is especially located between rails RA and RB and between radiometer detectors RD1 and RD2 so as to permit the demarcation of the first railway car following the initial locomotive (may be more than one locomotive). The coil 191 is included in the circuit of an oscillator detector 193 which functions to provide an output when the presence of metal causes a change in the magnetic forces of coil 191. Each locomotive having a motor or gear box disposed adjacent its first axle causes such change in the magnetic forces of coil 191 thus causing oscillator detector 193 to provide such output. A train car flip-flop 195 is normally in a condition such that AND gates AGB, AGCC, AGA and AGSM are controlled to prohibit the passage of respective signals. Flip-flop 195 is operated to an opposite condition when a first axle pulse is provided for the first railway car as applied to gate clamp 197 over wire 198 in the absence of a signal from detector 193.

Electrical output signals provided separately by wheel detectors WD1 and WD2, each representative of a passing wheel, are effective to control counting circuits for providing control gating pulses which are representative of the first axle for each railway car, the last axle for each railway car, and a car count pulse for each railway car.

With respect to wheel detector WD1, each electrical output signal is supplied to a hub gate pulse amplifier 200 where it is amplified and thereafter supplied to a flip-flop 201. An output pulse of a definite duration derived from flip-flop 201 is then supplied to a hub gate pulse stretching flip-flop 202 where it is lengthened in duration and further supplied to a trigger generator 181.

With respect to wheel detector WD2, each electrical output signal is supplied to an amplifier 152 where it is amplified and further supplied to an amplifier and pulse width control 204 where it is further amplified with the pulse width being determined so as to exclude those signals occurring from extraneous sources. To insure that the extraneous signals which may occur after a signal of proper width is accepted, which is characteristic of a passing wheel, the first output of proper width from control 204 is supplied to a one-shot multivibrator 205 which is controlled to an opposite condition for approximately thirty milliseconds thus excluding any extraneous signals picked up thereafter by wheel detector WD2. The output derived from multivibrator 205 is supplied to trigger generator 181.

Reversible counters 183 associated with wheel detectors WD1 and WD2 are employed, as described above, to register counts in both forward and reverse directions according to the existing conditions of respective direction flip-flops 184. Each of the direction flip-flop 184 functions to control the outputs from respective trigger generators 181 as applied to respective reversible counters 183, as described above. The first forward count controlling reversible counter 183 associated with wheel detector WD1 causes an output to be supplied to a first axle pulse control 207 which produces a first axle pulse. Direction flip-flop 184 associated with wheel detector WD2 functions to provide an output, when it is controlled by an output from control 186 to permit reversible counter 183 to register counts in a reverse direction which is supplied to car count pulse control 208 which functions to provide a car count pulse of approximately fifty milliseconds in duration. When direction flip-flop 184 associated with wheel detector WD2 is operated by control 186 to permit forward count registration to be effective, an output therefrom is supplied to last axle pulse control 210 which provides at its output a last axle pulse of approximately fifty milliseconds in duration.

The electrical output signals provided by each of the radiometer detectors RD1 and RD2 is supplied to a voltage signal pre-amplifier 212 where it is amplified and then supplied to a voltage signal amplifier 213 for further amplification. Each amplified signal is then supplied to a hub signal storage circuit 215 where it is stored for approximately three milliseconds as determined by the output supplied from flip-flop 201 over wire 199. Each such stored signal is then supplied to a pulse height detector 216 during a period of time as determined by the output supplied from flip-flop 202 over wire 203. Each signal received by detector 216 is compared with a threshold signal (predetermined to establish degree of overheated journal temperature) which is employed to determine if the signal is supplied to a flip-flop 217 for storage. Each such signal received by flip-flop 217 represents an overheated journal temperature condition for a monitored journal. The flip-flops 217 are simultaneously controlled to provide respective outputs on the occurrence of a last axle pulse as supplied through pulse delay 219 and over wire 211. It is noted that each of the flip-flops 217 only provides an output when it has effectively stored a signal derived from the respective detector 216.

Each electrical output signal derived from radiometer detectors RD1 and RD2 which represents an overheated journal for each side of a railway car and stored by respective flip-flops 217 is supplied to respective print controls 221 and 222 through AND gates AGB and AGA. Similarly, each electrical output pulse supplied from scintillator 30 is supplied to print control 224 through AND gate AGSM. The car count pulse derived from control 208 is supplied over wire 226 to count control 227 through AND gate AGCC.

According to the arrangement of wheel detectors WD1 and WD2, radiometer detectors RD1 and RD2, and scintillator 30, the order of occurrence of such pulses is similar for each direction of train travel. That is, the car count pulse is first supplied to count control 227 followed by an electrical output pulse from scintillator 30 to its print control 224 according to the description above. Thereafter, the flip-flops 217 provide respective outputs only according to detected overheated journals by respective radiometer detectors RD1 and RD2.

Each of the controls 221, 222, 224 and 227 are effective to control digital recorder 118 to provide a permanent recording of journal temperature information as well as strained movement information for each railway car in a passing train. The output supplied by count control 227 functions to cause a count registration in recorder 118 as generally described above, while the output from print control 224 causes digital recorder 118 to provide a permanent recording of the character shown in FIGS. 11 and 12. Thereafter, an output derived from either or both of print controls 221 and 222 functions to cause recorder 118 to provide similar recordings to those shown in FIGS. 11 and 12. In this connection, two additional columns can be provided so as to provide recordings for each side of a passing train. In order that each of the controls 221, 222, 224 and 227 is effective for approximately one-hundred milliseconds to suitably control recorder 118 as described above, a control print flip-flop 230 is employed to maintain each of the controls operative for such one-hundred milliseconds. In addition, outputs from controls 221 and 222 are supplied to recorder 238 and marker pen No. 1, while outputs from control 224 are supplied to marker pen No. 2.

A relay R is provided and controlled by a switch and relay control circuit 232 which receives its input from flip-flop 202. As a train passes the radiometer detector location in either direction, flip-flop 202 is operated for each passing wheel to the condition wherein it provides the required gating voltage for operating circuit 232 which insures that relay R is energized for each passing wheel. To insure that the relay R remains energized for a predetermined period following the operation of flip-flop 202 to its nongating condition, a capacitor 234 which is normally charged through back contact 235 of relay R and a resistor 236 is effective to hold the relay R energized for a predetermined period after the gating voltage from flip-flop 202 ceases. Thus, for a train that passes the radiometer detector location, relay R remains energized, while for a train that stops in the vicinity of the radiometer detector location, relay R is deenergized in a short period of time following the passage of the last wheel over wheel detector WD1.

One use that is made of the relay R is to control the motor operation of an analog recorder 238 through its front contact 239. When this front contact 239 closes upon the arrival of a train at the radiometer detector location, positive (+) energy is applied through such contact 239 to the recorder 238 to set it into operation. Outputs derived from circuits 215 representative of monitored journal temperatures are supplied to recorder 238 and to Analog Pens Nos. 1 and 2 therein for recording purposes.

When relay RP is controlled, it functions to control the shutters included with radiometer detectors RD1 and RD2 to a nonblocking position through a front contact 245. Also, it functions to control a stick circuit for track repeater relay TRP through a front contact 246. The track repeater relay TRP is initially energized when a train is detected as being in the defined stretch of track as relay TR is deenergized in the usual manner for controlling relay TRP through its back contact 248.

When a train is detected as entering the defined stretch of track and relays TR and TRP are accordingly controlled, certain circuits are completed for defining such entrance and insuring that the system is in readiness. Reversible counters 183 receive a positive (+) input through back contact 250 of relay TR to insure each is in its zero counting position. A positive (+) input is supplied through back contact 251 of relay TR to flip-flop 195 to insure it is in its proper operating condition. A positive (+) input is supplied to print controls 221 and 222 through front contact 253 of relay TRP and to print control 224 through front contact 254 of relay TRP for rendering such controls 221, 222 and 224 effective for causing recorder 118 to print an indication of "000" for each identified column and the existing time. When the train is detected as having left the defined section of track and relay TRP is deenergized, a positive (+) input is supplied through back contacts 253 and 254 to effect a similar printing of the total count registration and the existing time. Also, a positive (+) input is supplied through back contact 255 of relay TRP to a reset control delay 256 which functions to provide an output, after a short delay, to a recorder reset control 258. Control 258 then functions to operate recorder 118 to an initial condition in readiness for the next train entering the defined section of track.

*Description for circuit arrangement of FIG. 10*

Referring to the circuit arrangement illustrated in FIG. 10, it is noted that the coil 191 and oscillator detector 193 are employed with the scintillator 30 to control the operation of a marker pen in the analog recorder 238. Use is made of the track relay TR in effecting such operation.

Each of the electrical outputs supplied from scintillator 30 control recorder 238 through an AND gate 262 only provided a bistable multivibrator 264 has been operated from a normal operating condition to an opposite operating condition. When the oscillator detector 193 provides an output as determined by the appearance of a locomotive over coil 191 which is supplied to bistable multivibrator 264 through back contact 266 of a detection control relay D.C., multivibrator 264 is operated to the opposite operating condition where relay D.C. is energized. This prevents further outputs provided by detector 193 from being supplied to multivibrator 264. Multivibrator 264, in its opposite operating condition, functions to control recorder 238 in operation and to permit AND gate 262 to be effective for passing electrical output signals derived from scintillator 30.

The marker pen in recorder 238 is then operated for each electrical output signal derived from scintillator 30 which is representative of a car having an externally communicating strained movement detector. When employing the strained movement detector shown in FIGS. 2 and 3, the recordings made by the marker pen represent railway cars which have not been subjected to excessive strain movements. The strained movement detector shown in FIGS. 4 and 5, if employed, would cause the recorder 238 to provide pen-made indications for each car having been subjected to an excessive strained movement. In this case, the relative distance from the start of tape movement could be used to determine the sequential number of the cars within the train prior to the first pen-made indication where the approximate distance of tape movement is related to the speed of the passing train and length of railway cars is known. With the speed of the passing train being assumed as substantially constant, such indications would appear to be substantially equally spaced on the recorder tape, while the absence of an indication as indicated by an abnormal space between pen-made indications is indicative of a car having been subjected to an excessive strain movement.

The multivibrator 264 is controlled from its opposite operating condition to its normal operating condition when the train is detected as having left the defined section of track. To effect this operation, a positive (+) input is supplied through front contact 267 of relay TR, through front contact 268 of relay DC, to the multivibrator 264. The energizing control for relay DC is disconnected when multivibrator 264 returns to its normal operating condition which causes relay DC to be deenergized.

Having described a strained movement detection system by employing several specific embodiments of this invention as illustrations, it is desired to be understood that the various circuit arrangements shown have been selected particularly to facilitate in the disclosure of this invention but not to limit the number of forms that this invention may assume. It is desired to be understood also that various other modifications, adaptations and alterations may be made to the specific circuit arrangements and forms shown to meet the requirements of practice without in any manner departing from the spirit or scope of this invention.

What I claim is:

1. A system for monitoring railway cars in a train moving over a stretch of track subjectable to excessive strained movements comprising, in combination, a plurality of strained movement detectors one distinctively disposed on each of said railway cars, each said detector being operable to a plurality of positions characteristic of subjected strained movements of the associated said railway cars and capable of providing external communication in one of said plurality of positions, receiving means positioned adjacent said stretch of track distinctively controllable by each said detector when in its said one position as it moves within a defined communicating distance of said receiving means, indicating means responsive to each controlled condition of said receiving means, actuatable means disposed adjacent said stretch of track distinctively responsive to the presence of said train for distinctively controlling said indicating means to define by distinctive indication each controlled condition of said receiving means.

2. The system according to claim 1, wherein said stretch of track is defined by a track circuit including relay means operable to one of two positions when a train enters said section of track and operable to a second of two positions when said train leaves said stretch of track, said indicating means being responsive to said relay means in its said one position for distinctively demarcating the entrance of said train into said stretch of track and being further responsive to said relay means in its said second position for distinctively demarcating the exit of said train from said stretch of track.

3. The system according to claim 2, wherein said indicating means includes a plurality of controllable means, each when controlled being capable of causing a part of said distinctive indication to be provided, said plurality of controllable means being simultaneously controlled when said relay means is operated to said one position for demarcating said train entrance, and means responsive to said relay means in said one position for limiting the time of controlling said plurality of controllable means to at least the time required for effecting said distinctive indication.

4. The system according to claim 3, wherein said means includes a relay control means normally deenergized but operable to an energized condition by said relay means when operated to said one position, a time element means for permitting said limited control time to be effective only according substantially to the duration of time required to cause said relay control means to become energized after said relay means is operated to said one position.

5. The system according to claim 3, wherein said means includes a relay control means normally deenergized but operable to an energized condition by said relay means when operated to said one position, at least one of said plurality of controllable means capable of being controlled to a particular condition, circuit means being electrically connected only for a limited time according to the energized condition of said relay control means when said relay means is operated to said second position for controlling said indicating means to said particular condition.

6. The system according to claim 2, wherein said actuatable means is capable of responding to each locomotive appearing within a passing train, multiple position means controllable to a plurality of stable positions, said actuatable means in its initial responsive condition causing said multiple position means to be operated to one of said plurality of stable positions wherein said indicating means is controlled for permitting said indicating means to be responsive to each controlled condition of said receiving means, said indicating means being rendered operative according to the operation of said multiple position means to said one stable position, and means controlled in said one stable position of said multiple position means for permitting said indicating means to be operative and responsive until said relay means is controlled to said second position.

7. The system according to claim 6, wherein each said detector is permitted to provide an external communication only provided the associated railway car has not been subjected to an excessive strained movement, said indicating means being controlled by each responsive condition of said receiving means and according to said one stable position of said multiple position means for providing a distinctive recorded indication with such recorded indications appearing in a successively spaced manner where the distance between such indications is substantially equal for successively monitored railway cars, the relative spacing distance of said recorded indications being effective to provide an indication of a monitored railway car having a detector which has registered an excessive strained movement experienced by the associated car.

8. The system according to claim 6, wherein each said detector is permitted to provide an external communication only provided the associated railway car has been subjected to an excessive strained movement, said indicating means being controlled by each responsive condition of said receiving means and according to said one stable position of said multiple position means for providing a distinctive recorded indication with such recorded indications appearing in a successively spaced manner where the distance between such indications is substantially equal for successively monitoring railway cars having externally communicating detectors, the relative distance that an included tape travels prior to the provision of a first indication being interpreted as the sequential number of locomotives and railway cars following the initial locomotive as related to train speed and car lengths.

9. The system according to claim 1, wherein said actuatable means includes a plurality of wheel actuatable means spaced along one rail of said stretch of track, each of said plurality of wheel actuatable means being capable of providing a distinctive output signal for each wheel passing thereby, counting means responsive to said signals for registering each wheel passing over said plurality of wheel actuatable means, control means responsive to the passage of certain of said wheels located adjacent to two coupled railway cars and/or locomotives as governed by outputs from said counting means for providing a distinctive output for the car or locomotive last passing said plurality of wheel actuatable means, said indicating means being responsive to each said distinctive output for registering the sequential number of each locomotive and railway car included in a passing train.

10. The system according to claim 9, wherein said control means includes storage means responsive to outputs provided for each of the count registering positions except the zero counting position of said counting means for providing a distinctive storage characteristic of the passage of all wheels for one side of the train located adjacent coupled locomotives and/or railway cars, said control means also including an output producing means controlled only according to the presence of said distinctive storage simultaneously with the registration of said counting means in its normal count registering position for providing said distinctive output signal for the locomotive or car last passing said plurality of wheel actuatable means.

11. The system according to claim 9, wherein the spaced distance of said plurality of wheel actuatable means is greater than the shortest distance between the closest wheels on successively coupled locomotives and/or railway cars, said counting means including a separate counting means for each of said plurality of wheel actuatable means, a separate control means for each separate counting means operable to one condition according to the separate counting means being in a zero registering position, both of said separate counting means being simultaneously operated when respective of said counting means registers similar counts to a second condition, said indicating means being controlled by at least one separate counting means in said second condition to cause a count registration to occur for sequentially registering the number of locomotive and cars within the passing train.

References Cited by the Examiner

UNITED STATES PATENTS

| | | | |
|---|---|---|---|
| 1,745,522 | 2/1930 | Baskerville | 73—492 |
| 2,620,435 | 12/1952 | Vogt et al. | 246—29 |
| 2,818,732 | 1/1958 | Bennett | 246—30 |
| 2,872,586 | 2/1959 | Papanek | 250—106 |
| 3,076,089 | 1/1963 | Spalding | 246—169 |
| 3,090,859 | 5/1963 | Rodin | 246—169 |
| 3,120,130 | 2/1964 | Cohen | 73—517 |
| 3,145,571 | 8/1964 | Maynard et al. | 73—492 |

ARTHUR L. LA POINT, *Primary Examiner.*

JAMES SHANK, EUGENE G. BOTZ, *Examiners.*

S. B. GREEN, *Assistant Examiner.*